Nov. 10, 1931.  H. HARBORD  1,830,998
FREIGHT HANDLING SKID
Filed Sept. 16, 1930   2 Sheets-Sheet 1

INVENTOR
Harry Harbord
BY
G. Wright Arnold.
ATTORNEY

Nov. 10, 1931.  H. HARBORD  1,830,998
FREIGHT HANDLING SKID
Filed Sept. 16, 1930  2 Sheets-Sheet 2
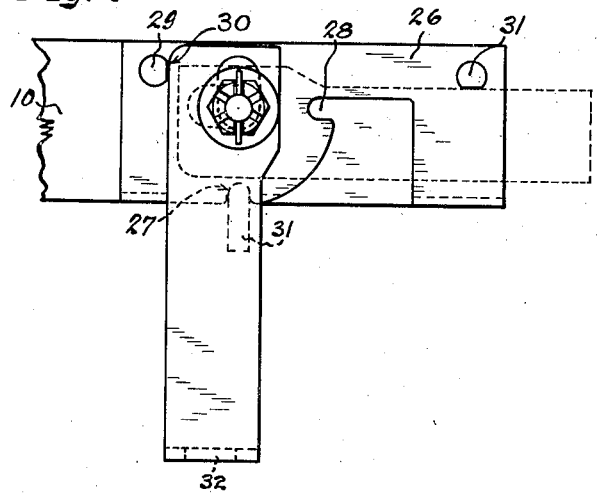
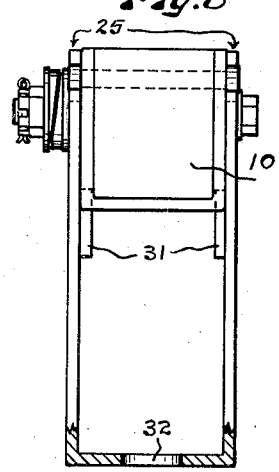
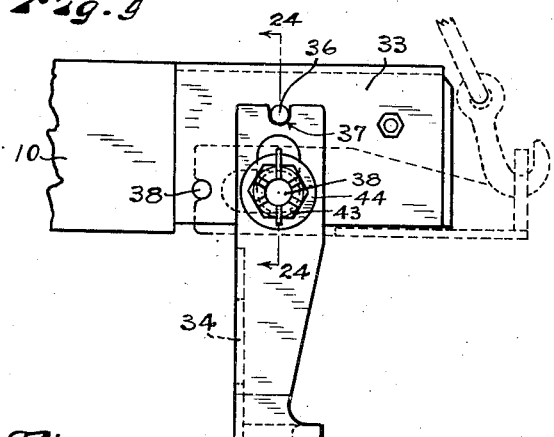
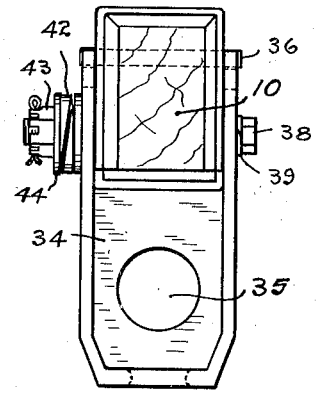
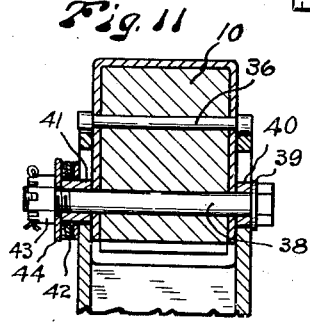
INVENTOR
Harry Harbord
BY
G. Wright Arnold
ATTORNEY Patented Nov. 10, 1931

1,830,998

UNITED STATES PATENT OFFICE

HARRY HARBORD, OF TACOMA, WASHINGTON

FREIGHT HANDLING SKID

Application filed September 16, 1930. Serial No. 482,277.

My invention relates to improved means for handling certain classes of freight from and to the holds of vessels and from and to the docks alongside such vessels, from and to freight cars and their station platforms and in other situations where such articles are to be picked up and transported as, for example, in docks, storage or other warehouses or for movement by motor truck, railway car and/or other methods of transporting commodities.

The principal object of my invention is to provide an improved portable platform or skid, which after being loaded with bales, sacks, boxes or other commodities, may be placed or arranged upon another such loaded skid in a ship, car, warehouse, motor truck or other place with a minimum loss of space, which skid is constructed for the convenient handling by ordinary ships' hoists or cranes and shop tractor or industrial trucks either power or hand operated, employed about docks and warehouses.

More specifically, my invention contemplates constructing such a skid, that, when it is loaded or has piled upon it the articles that are to be moved from place to place, as, for example, to a dock, ship, barge or loading platform, it will stand sufficiently above the floor to enable the platform or other engaging means of an industrial truck, hand or power operated, such as employed in and around warehouses, docks, railroad stations, manufacturing plants and other places, to be moved under it and lift it and the goods piled thereon, and after the skid has been moved to the desired place from which it is to be lifted, preliminary to swinging or loading it into a ship, motor truck, or any vehicle for transportation and/or for storing or tiering one skid upon the other either loaded or empty for either transportation or for storing in warehouse, dock, manufacturing plant, shed, or on any transporting vessel or vehicle, or the place where an ordinary sling board or skid may be used or employed, can have its supporting legs turned up so that they project beyond the upper face of the skid and thus perform the combined functions of economizing space in the ship, car, motor truck or warehouse, acting to some extent as guarding means to prevent the goods piled on the skid from sliding off and provide convenient means for hoisting the platform by a ship's tackle or other ordinary hoisting gear.

Industrial trucks, either power or hand operated, as referred to in this application, are well known and are used for lifting skids from the floor for movement from place to place. These trucks are provided with raisable platform, or prongs, or forks, or other means raised by hand or power, to hoist the skid sufficiently clear of the floor for movement. This platform, prongs, forks or other means are adapted to project under the skid for supporting, raising and conveying the skid from place to place. Certain of these industrial trucks, hand or power operated, are built with a sufficient vertical travel of the platform, prongs, forks, or other means so that one skid loaded or empty, may be piled upon top of another such loaded skid, this object being to save floor space where the commodities are assembled, stored, or shipped. My improved freight handling skid has the advantages of saving the lost or void space between the skids whether loaded or empty when stored one upon the other by the means of the operation of my reversible legs. The ordinary industrial truck requires the skid to be raised a certain distance from the floor so that the lifting mechanism of the industrial trucks may engage the loaded skid. While with the use of an ordinary skid this distance, which varies from four inches or more, means a certain lost space when the loaded skids are either placed on the floor or one on top of the other, by the operation of my reversible legs this space is cut to a minimum thereby preventing this loss heretofore obtained in ordinary skids. The ordinary skid as now used is equipped with fixed legs at the four corners, or by long narrow sled or runner type of legs which fail to provide a sufficient bearing surface when one skid is piled upon the other, the result being damage to the package or commodity which is loaded on the lower skid due to the small bearing surface of the leg or channel upon which the skid rests and these legs or channels do not provide proper or sufficient bearing area to properly tie the various units of the commodity loaded on the lower skid together. With my improved freight handling skid, when the legs are reversed, and one loaded skid is placed upon another, a continuous wide bearing surface is provided on the lower surface of the skid for the length of the skid, thereby reducing the chance of damage to the commodities on the lower skid to a minimum and firmly holding the commodities on the lower skid in place, preventing sliding or slipping. Further, in my improved freight handling skids, there are no sharp corners as would be produced by the ordinary skid equipped with four legs, one disposed on each of the four corners, or by a skid equipped with narrow runner members, and I thereby prevent mechanical injury to the commodities loaded on the lower skid as would be caused by such corners.

The above mentioned general objects of my invention, together with others inherent in the same, are attained by the device illustrated in the following drawings, the same being preferred exemplary forms of embodiment of my invention, throughout which drawings, like reference numerals indicate like parts:

Fig. 5 is a front view of one of the reversible legs and showing also the angular wear plate that is interposed between such leg and the skid beam member that it is pivotally connected with;

Fig. 7 is a side elevation of a modified form of a freight handling skid constructed in accordance with my invention, a small portion of the skid beam to which the leg is connected being also shown, and showing in dotted lines the leg in hoisting position;

Fig. 8 is a front elevation of the parts shown in Fig. 7, partly in vertical section;

Fig. 9 is a side elevation of another modified form of a freight handling skid constructed in accordance with my invention, a small portion of the skid beam to which the leg is connected being also shown; and showing in dotted lines the leg in hoisting position and engaged by a hook from an ordinary hoisting gear;

Fig. 10 is a front elevation of the parts shown in Fig. 9; and

Fig. 11 is a fragmentary vertical section taken along line 24—24 in Fig. 9.

Figure 1:
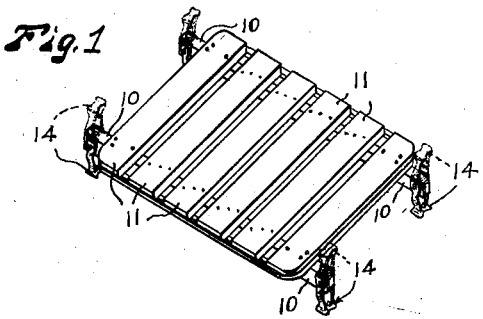
Figure 1 is a perspective view of a skid embodying my invention, and showing in dotted lines the supporting legs therefor turned to project above the upper surface of the skid to adapt them to be engaged by hooks that form a part of any ordinary hoisting gear.
Figure 6:
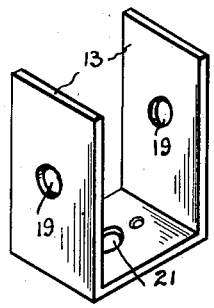
Fig. 6 is a perspective view of the wear plate shown in Fig. 5.

Referring to the several figures of the drawings, Figure 1 shows generally a skid or platform, which, as here shown, comprises two comparatively heavy side beams 10 to which are bolted or otherwise secured the planks 11 that together constitute the deck of the device and upon which the articles to be moved, as hereinafter described, are placed or loaded.

Figure 3:
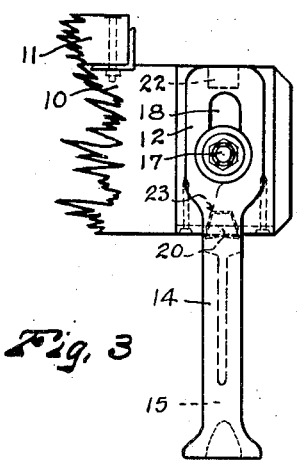
Fig. 3 is a view in side elevation of one of the supporting legs and a small portion of the skid frame, such leg being turned down in skid-supporting position.
Figure 5:
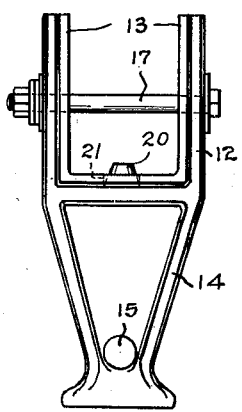

As shown, the end portions of each of the beams 10 project beyond the deck portion, and upon these projecting end portions are pivotally mounted the leg members that are of such length, that, when in supporting position as in Fig. 3, will hold the skid in proper position to enable the weight receiving member of an industrial truck to be inserted beneath it and be thereafter raised for engagement with the skid platform, as will be understood.

Each leg, as shown in Figs. 1 to 5 comprises a yoke-shaped end portion 12 (which when in normal supporting position will be the upper end and will therefore be so termed herein) which is of a shape to embrace one of the projecting end portions of a beam 10, it being sufficiently large, preferably, to also receive between it and the beam a correspondingly shaped wear plate 13, which is to be secured in any suitable manner to the beam. The lower part 14 of each leg, in the construction shown, is in the form of two plate-like pieces that are extensions of the parallel sides of the upper end portion 12, said pieces converging downwardly and merging in a foot member. Preferably, also, for strengthening purposes there is formed between the sides of the lower end portion, a web as clearly shown in Fig. 4, and in this web, adjacent to the said foot, is a hole 15, that is adapted to receive a hook, such as 16, when the leg is reversed as in Fig. 2.

Each leg is movably mounted in place upon securing means, as a bolt 17 that passes through slots 18 in the respective parallel side members of the upper part of the leg, such bolt also passing through holes 19 in the sides of the angular wear plate 13. The leg 14 is held in any position in which it is placed by yielding means, as by friction, when the nut is tightened on the bolt 17. Obviously, this may be accomplished by other means.

On the upper face of the cross-bar that constitutes the lower part of the yoke-shaped portion of each leg is a stud 20 that is adapted, when the leg is down in supporting position, to project through a hole 21 in the lower member of the angular wear plate 13 and into a socket 23 in the beam 10. The socket 23 in the underface of the beam 10 is opposite the hole 21 in the wear plate 13 in order to receive the stud, thereby enabling a stud to be employed of materially greater length than the width of the material in which is the hole 21, and in some instances to dispense with the said wear plate. In the upper face of the beam 10 and in line with the hole 21, is cut a socket indicated by 22 in Fig. 3, into which the stud 20 is adapted to project when the leg is turned up into the position shown in Fig. 2.

Figure 2:
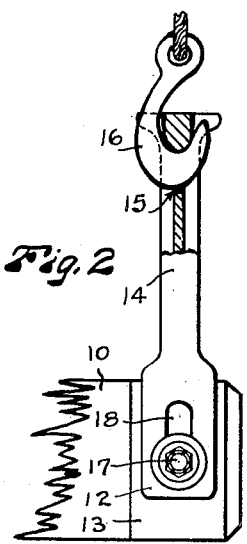
Fig. 2 is a detail partly in side elevation and partly in vertical section of one of the supporting legs in its turned-up position and engaged by a hook that forms part of an ordinary hoisting gear, a small portion of the skid beam to which the leg is connected being also shown.
Figure 4:
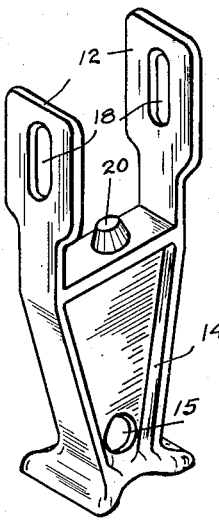
Fig. 4 is a perspective view of the leg shown in Figs. 2 and 3.

The engagement of the stud 20 with either the hole 21 or the socket 22 will cause such leg to be held substantially vertical in either of its two operative positions, viz., where it serves as a supporting means for the skid frame, as in Fig. 3 or as a means for the attachment of a hook, as in Fig. 2, when the skid frame and its load are to be bodily lifted. It will be understood that the provision of the longitudinal slots 18 permit the relative up and down movements of the leg that are required to effect the engagement of the stud 20 with the openings in the upper and lower faces of the beam 10 and also the withdrawal of the stud therefrom. If desired, the upper surface of each beam 10 might have its projecting end portions protected by a wear plate with a hole therethrough for the stud 20 of the adjacent leg to project through, but such protection is ordinarily not required as in the case where the legs are in supporting position and are bearing the weight of the skid frame and the load carried thereon.

The leg members shown in the alternative constructions, Figs. 7 to 11 inclusive, are pivotally connected to beams 10 of a deck, not shown, constructed similarly to a deck as shown in Fig. 1, except that the beams 10 do not project beyond the deck portion, thereby effecting a considerable saving of storage room. The legs are in supporting position as shown in Figs. 7 to 11 inclusive, and are in hoisting position, when parallel to the beam 10, as shown by dotted line in Fig. 7 and Fig. 9.

In the alternative constructions shown in Figs. 7 to 11 inclusive, I have shown an additional friction means, as best shown in Fig. 11, which is adapted to the construction shown in Figs. 1 to 6 inclusive, as well, to secure the legs in the position desired when the legs are not in use so that the leg will not swing when the freight handling skid is being transported from place to place on an industrial truck, or where similar problems exist. Washer 39 is slidably mounted upon bolt 38 against the head of such bolt on one side and on the other side against the side of the spacer ring 40 which spacer ring is inserted in the hole in the leg. The bolt 38 is preferably secured by friction to the beam 10, and upon the other end of the bolt is another spacer ring 41, which spacer ring is thicker than the spacer ring 40 and inserted in another similar hole on the other side of the leg. Compression spring 42 is slidably mounted upon the spacer ring 41 and said spring is compressed by tightening and locking castle nut 43 against the washer 44. In operation the leg will rotate upon spacer rings 40 and 41, preventing any wear upon the bolt 38, and by tightening the castle nut 43 the desired yielding pressure is provided against rotation.

Referring to the alternative form shown in Figs. 7 and 8, one of the four legs is shown which comprises a yoke-shaped end portion 25, shaped to embrace the beam 10, and wear plate 26. Preferably the beam 10 is cut away and a yoke-shaped wear plate is secured thereto, with the open end of the yoke preferably upward, the wear plate 26 being provided on each of its outer sides with a groove 27 to engage the studs 31 on the sides of the leg to secure the leg in supporting position, and a groove 28 to engage the studs 31 to secure the leg in hoisting position. Additional means to secure the leg in supporting position are provided by pin 29, which extends through and is secured in the beam 10, and the wear plate 26, the flat portion of said pin, as clearly shown, engaging the edge of leg member on either side thereof as shown at 30. Additional means to secure the leg in hoisting position, as shown in the dotted portion of Fig. 7, are provided by pin 31, which extends through and is secured in the beam 10 and the wear plate 26. Hole 32 is adapted to receive the hook from an ordinary hoisting gear. In this alternative construction, compound securing means are shown to secure the leg in either vertical position, that is, supporting position or in horizontal position, that is, hoisting position.

Referring to the alternative construction shown in Figs. 9, 10 and 11, the leg is again shaped to embrace the wear plate 33 and the beam 10. This leg is provided with a reinforcing web 34, which connects the inner edge portions of the side members of the leg, and being thus disposed forms of the leg a channel-shaped member that is adapted to receive or embrace the beam when such leg is swung into the approximately horizontal position as indicated by the dotted lines in Fig. 9. This web has a hole 35 adapted to receive a hook for hoisting and when in hoisting position, the web provides means for carrying the load. The wear plate 33 is yoke-shaped and in this construction, preferably the open end of the yoke is in downward position. The beam 10 is also preferably cut away, as clearly shown in Fig. 9, so that the wear plate 33 and beam 10 will be continuous and further so that the lower surface of the leg, when in hoisting position, will be continuous with the lower surface of the leg. Pin 36, which extends through and overhangs beam 10, engages grooves 37 on both sides of the leg, to secure the leg in supporting position, and pin 38, which extends through and overhangs beam 10, engages grooves 37 on both sides of the leg to secure the leg in hoisting position.

In the use of a device embodying my invention, certain kinds of commodities can be handled much more expeditiously and cheaply than by apparatus and methods now in general use, for with articles either loose or in containers that can be placed upon the platform in such manner as to present an approximately level surface at the top of the pile. Successive loaded platforms can be loaded one on top of another in the hold of a ship, in or on a barge, freight car, motor truck, for example, or successively removed therefrom, by means of the ship's gear, to the dock or by hoisting and moving by industrial truck. It is contemplated that the devices such as herein described shall, after being loaded with articles in the manner above referred to, be shipped or stored with such articles, and, owing to the fact that the legs can be firmly held in raised position by reason of interlocking with the beams 10 of the frame, they will not only aid in holding the articles in place that are on the skid but such legs allow the skid that they are attached to, to rest firmly and evenly on the load of goods carried by another similar skid.

If the legs were rigid with the framework so that they always project downwardly, it would not be feasible to employ them in most cases in the manner here contemplated for using my device, for two reasons, viz, because such downwardly-extending legs would be apt to injure articles on a skid next below, and also because of the amount of space that such skids would occupy in a car or ship when being returned for further use, to the shipper or owner. With my improved device, the legs can be so turned that the skids can be stored in a car, ship, warehouse or other place so as to occupy the minimum amount of space.

Another advantage in connection with the constructions herein set forth, is that no separate or additional means have to be provided for the attachment of any hoisting member by which the skid and its load are raised or lowered, for with the lower portion of each leg provided with a hole, such holes serve, when the legs are in hoisting position, as effective means for connection of the usual hooks that constitute a part of ordinary hoisting gear.

Of course, the legs cannot be turned up until the skid frame is supported high enough to take the weight off of the legs. Such raising can be accomplished by the industrial truck that engages beneath the platform when the skid is moved from place to place, but it is better practice to cause such industrial trucks to bring the device in position to rest upon two heavy, separated beams, generally known around docks and warehouses as blocking, that are high enough to relieve the legs of the weight, and then move the tractor away before the position of the legs is changed, doing this so as to avoid any liability of damage to the industrial truck or its operator by any article being jarred off the skid during the engagement of the hoisting gear. This use of blocking also allows a greater utility of the industrial truck which is an expensive piece of machinery, and the industrial truck can be used constantly and need not be delayed awaiting unloading.

Obviously, changes may be made in the form, dimensions and arrangement of the parts of my invention, without departing from the principle thereof, the above setting forth only preferred forms of embodiment.

I claim:

1. A device of the character described, comprising in combination a platform and a plurality of legs connected therewith, said legs being each movably attached to the platform to adapt them to be moved from supporting position beneath the platform into position for engagement with a hoisting element, and means carried by the legs for engaging a hoisting element therewith.

2. A device of the character described, comprising in combination a platform and a plurality of legs connected therewith, said legs being each movably attached to the platform to adapt them to be moved from supporting position beneath the platform into position for engagement with a hoisting element, each of said legs having means at its normally lower end for the attachment thereto of such hoisting element.

3. A device of the character described, comprising in combination a platform and a plurality of legs movably connected therewith, and means for securing such legs to the platform so as to support the platform or to hold them in a different position to adapt them to be engaged by a hoisting means, and means carried by the legs for engaging a hoisting element therewith.

4. A device of the character described, comprising in combination a platform consisting of two spaced-apart beams and a deck secured thereon, of legs, each having a yoke-shaped upper portion that embraces an end portion of one of said beams, the side member of such yoke portion having corresponding longitudinal slots, a pivot bolt secured in each end portion of the beam and passing through said slots, said legs being adapted to be turned on said bolt to cause them to project below said platform and also to be turned at an angle thereto, and each having means on its normally lower end for the attachment thereof of a hoisting element, and means for interlocking the legs with the beams in either of such positions of the legs.

5. A device of the character described, comprising in combination a platform and a plurality of legs connected therewith, said legs being movable so as to project beyond the upper surface of the platform.

6. A device of the character described, comprising in combination, a platform and a plurality of legs connected therewith, said legs being movable so as to project beyond the upper surface of the platform, and each having means on its normally lower end for the attachment thereof of a hoisting element.

7. A device of the characted described, comprising in combination, a platform and a plurality of legs pivotally connected therewith to adapt them to be swung upwardly so as to project beyond the upper surface of the platform.

8. A device of the character described, comprising in combination, a platform and a plurality of legs pivotally connected therewith to adapt them to be swung upwardly so as to project beyond the upper surface of the platform, each leg having means on its normally lower end for the attachment thereto of a hoisting element.

9. A device of the character described, comprising in combination a platform, a plurality of legs movably connected therewith to adapt them to project above or below the platform, and means for interlocking said legs with the platform in either of such positions.

10. A device of the character described, comprising in combination a platform, a plurality of legs movably connected therewith to adapt them to project above or below the platform and each having means on its normally lower end for the attachment thereto of a hoisting element, and means for interlocking said legs with the platform in either of such positions.

11. A device of the character described, comprising in combination a platform consisting of two spaced-apart beams and a deck secured thereon, of legs pivotally connected with the projecting end portions of said beams to adapt them to be swung so as to project above or below said platform, and means for interlocking said legs with said beams in either of such positions.

12. A device of the character described, comprising in combination a platform consisting of two spaced-apart beams and a deck secured thereon, of legs pivotally connected with the projecting end portions of said beams to adapt them to be swung so as to project above or below said platform, and each having means on its normally lower end for the attachment thereto of a hoisting element, and means for interlocking said legs with said beams in either of such positions.

13. A device of the characted described, comprising in combination a platform consisting of two spaced-apart beams and a deck secured thereon, of legs each having a yoke-shaped upper portion that embraces a projecting end portion of one of said beams, the side members of such yoke portion having corresponding longitudinal slots, a pivot bolt secured in each projecting end portion of the beam and passing through said slots, said legs being adapted to be turned on said bolt to cause them to project above or below said platform and each having means on its normally lower end for the attachment thereto of a hoisting element, and means for interlocking the legs with the beams in either of such positions of the legs.

14. A device of the character described, comprising in combination a platform consisting of two spaced-apart beams and a deck secured thereon, of legs, each having a yoke-shaped upper portion that embraces a projecting end portion of one of said beams, the side member of such yoke portion having corresponding longitudinal slots, a pivot bolt secured in each projecting end portion of the beam and passing through said slots, said legs being adapted to be turned on said bolt to cause them to project above or below said platform and each having means on its normally lower end for the attachment thereof of a hoisting element, and means for interlocking the legs with the beams in either of such positions of the legs, such interlocking means comprising a stud on the horizontal member of said yoke portion and openings in the upper and lower faces, respectively, of the said beams.

15. A device of the character described, comprising in combination a platform and a plurality of legs connected therewith, said legs being movable so as to project in secured parallel alignment with the beams of said platform.

16. A device of the character described, comprising in combination, a platform and a plurality of legs connected therewith, said legs being movable so as to project in secured parallel alignment with the beams of said platform, and each having means on its normally lower end for the attachment thereto of a hoisting element.

17. A device of the character described, comprising in combination, a platform and a plurality of legs pivotally connected therewith to adapt them to be swung parallel to the beams of said platform.

18. A device of the character described comprising in combination, a platform and a plurality of legs pivotally connected therewith to adapt them to be swung parallel to the beams of said platform, each leg having means on its normally lower end for the attachment thereto of a hoisting element.

19. A device of the character described, comprising in combination a platform, a plurality of legs movably connected therewith to adapt them to project in parallel alignment with the beams of said platform or below the platform, and means for interlocking said legs with the platform in either of such positions.

20. A device of the character described, comprising in combination a platform, a plurality of legs movably connected therewith to adapt them to project in parallel alignment with the beams of said platform or below the platform, and each having means on its normally lower end for the attachment thereto of a hoisting element, and means for interlocking said legs with the platform in either of such positions.

21. A device of the character described, comprising in combination a platform consisting of two spaced-apart beams and a deck secured thereon, of legs pivotally connected with the end portions of said beams to adapt them to be swung so as to project in parallel alignment with the beams of said platform or below the platform, and means for interlocking said legs with said beams in either of such positions.

22. A device of the character described, comprising in combination a platform consisting of two spaced-apart beams and a deck secured thereon, of legs pivotally connected with the end portions of said beams to adapt them to be swung so as to project in parallel alignment with the beams of said platform or below the platform, and each having means on its normally lower end for the attachment thereto of a hoisting element, and means for interlocking said legs with said beams in either of such positions.

23. A device of the character described, comprising in combination a platform consisting of two spaced-apart beams and a deck secured thereon, of legs each having a yoke-shaped upper portion that embraces an end portion of one of said beams, the side members of such yoke portion having corresponding longitudinal slots, a pivot bolt secured in each end portion of the beam and passing through said slots, said legs being adapted to be turned on said bolt to cause them to project in parallel alignment with the beams of said platform or below the platform, and each having means on its normally lower end for the attachment thereto of a hoisting element, and means for interlocking the legs with the beams in either of such positions of the legs.

In witness whereof, I hereunto subscribe my name this 10th day of September, 1930.

HARRY HARBORD.